United States Patent Office 3,527,086
Patented Sept. 8, 1970

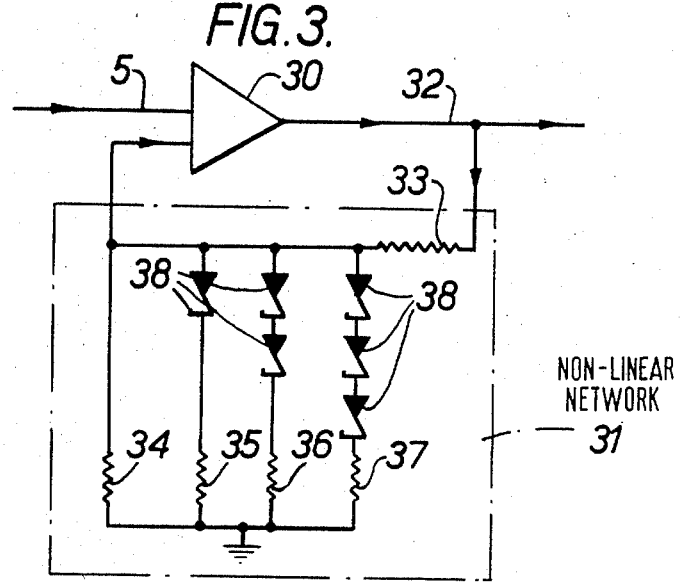
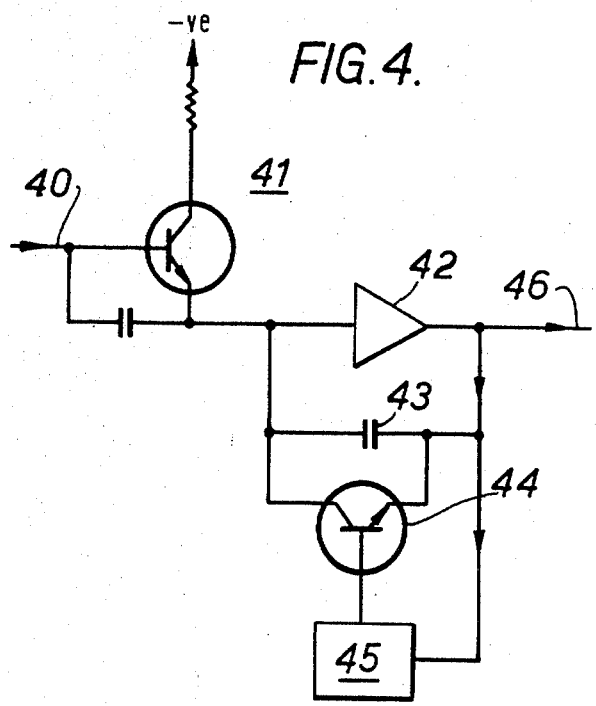

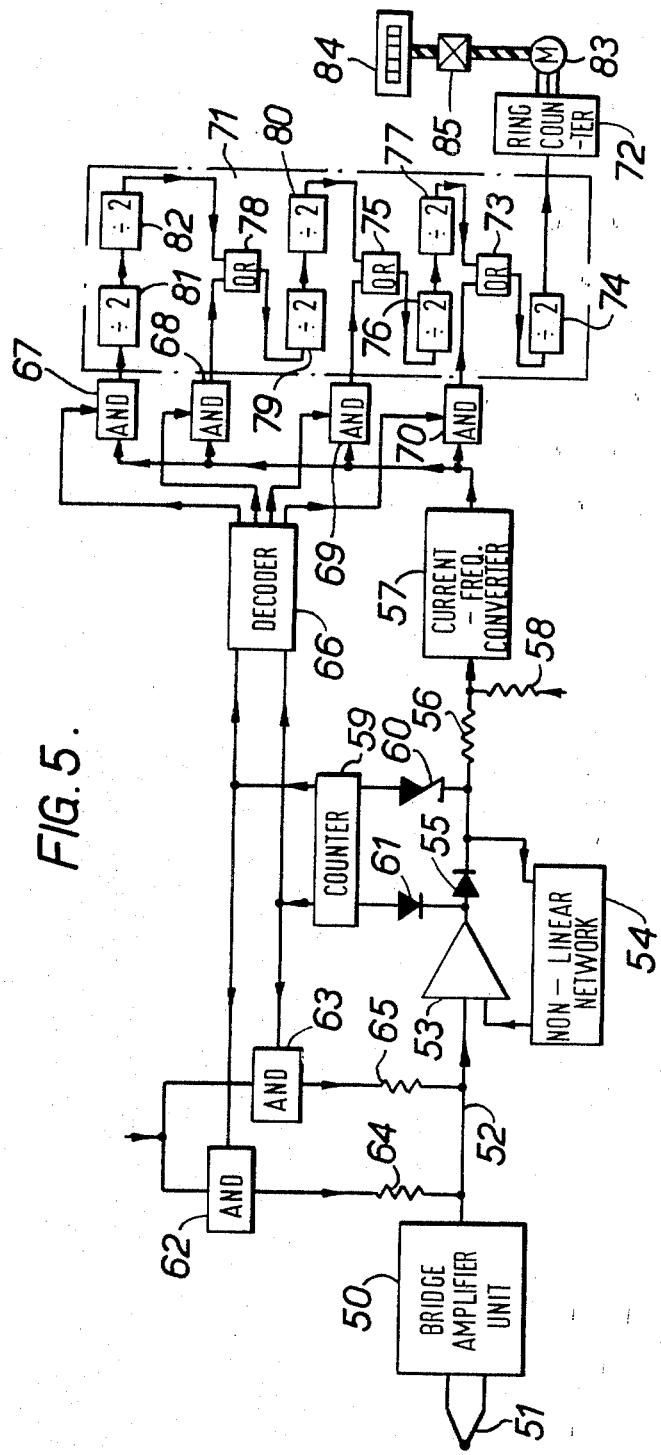

3,527,086
APPARATUS FOR PROVIDING A REPRESENTATION OF ENGINE LIFE
John F. O. Evans, Micheldever, near Winchester, and Derek Anthony Rush, Brighton, England, assignors to Smith Industries Limited, London, England, a British company
Filed Jan. 14, 1969, Ser. No. 790,991
Claims priority, application Great Britain, Jan. 15, 1968, 2,234/68; May 17, 1968, 23,469/68
Int. Cl. G01m 15/00
U.S. Cl. 73—116
12 Claims

ABSTRACT OF THE DISCLOSURE

Representation of expended life of a gas-turbine engine is made in accordance with a logarithmic function relating permissible running-time to sensed jet-pipe temperature through four successive temperature ranges. A signal representative of the rate of life-expenditure is derived by a function generator from a sensed-temperature signal that is restricted to a range of signal-levels corresponding to the lowest of the four ranges. Compensation for the restriction is made in the engine-life representation by the application to the rate signal of a scaling factor (affecting signal-magnitude or -frequency) that is dependent upon which range is involved.

---

This invention relates to apparatus for providing a representation of engine-life.

In order that an engine shall give efficient and trouble-free service, it is the practice to specify that maintenance procedures shall be carried out at regular intervals. These intervals are commonly expressed in terms of permissible running-time of the engine and are determined in relation to the demand which in any particular case is imposed on the engine. If in any case the demand imposed can be predicted as being substantially constant, or not varying beyond a nominally-normal level, the intervals can be straightforward expressions of running-time, the expended part of any interval being given by the sum of the periods for which the engine has operated since the start of the interval. This sum gives a satisfactory representation of what is herein referred to as engine-life, the imposed demand in these circumstances being for practical purposes constant, so that its effect on the engine is represented satisfactorily solely by the time for which it is applied.

Where there is substantial and unpredictable variation in the imposed demand the effect of the engine cannot be related simply to the running-time, and account has to be taken of the extent and duration of the variation, in assessing engine-life. Some measure of the extent to which the imposed demand varies beyond a normal operational level can be obtained by reference to the consequent variation in one or more operational parameters of the engine, and a representation of engine-life can thereby be provided by monitoring variation with time of the relevant parameter or parameters throughout operation. Apparatus that is of a general kind suitable for providing a representation of engine-life in accordance with a monitored parameter, is for example, described in our earlier U.S. Pat. No. 3,362,217, issued Jan. 9, 1968. It is with apparatus of this general kind that the present invention is more particularly concerned.

According to the present invention apparatus for providing a representation of engine-life in accordance with a predetermined operational parameter of the engine, comprises means for sensing the value of said parameter, means for deriving a first signal that is dependent upon the sensed value of said parameter, a function generator for deriving in accordance with said first signal a second signal dependent upon the rate of expenditure of engine-life, and means for providing said representation of engine-life in accordance with said second signal, said means for deriving said first signal including means for effecting adjustment of said first signal in response to circumstances in which the sensed value of said parameter lies outside a predetermined operational range, said adjustment when effected acting to confine said first signal to correspond to a value of said parameter that lies within said range and is dependent upon the sensed value, and said means for providing said representation of engine-life including means that is arranged to provide compensation in said representation for the adjustment effected as aforesaid.

The adjustment of said first signal may be effected in steps, the number of steps involved in each case being dependent upon the sensed value of said parameter. In these circumstances, the compensation for the adjustment effected may be made in accordance with the number of steps involved in the adjustment. Furthermore, the adjustment, which may be made by subtraction of a signal of predetermined magnitude, may be effected in dependence upon the magnitude of signal applied to the function generator or alternatively, in accordance with the magnitude of signal derived thereby.

Two forms of apparatus, both in accordance with the present invention and both for providing a representation of engine-life of an aircraft gas-turbine engine, will now be described, by way of example, with reference to the accompanying drawings, in which:

FIGS. 3 and 4 are circuit diagrams of a non-linear function generator and a current-to-frequency converter, respectively, suitable for use in the apparatus of FIG. 2;

FIG. 5 is a diagrammatic representation, partly in schematic form, of the second form of engine-life apparatus.

Figure 1:
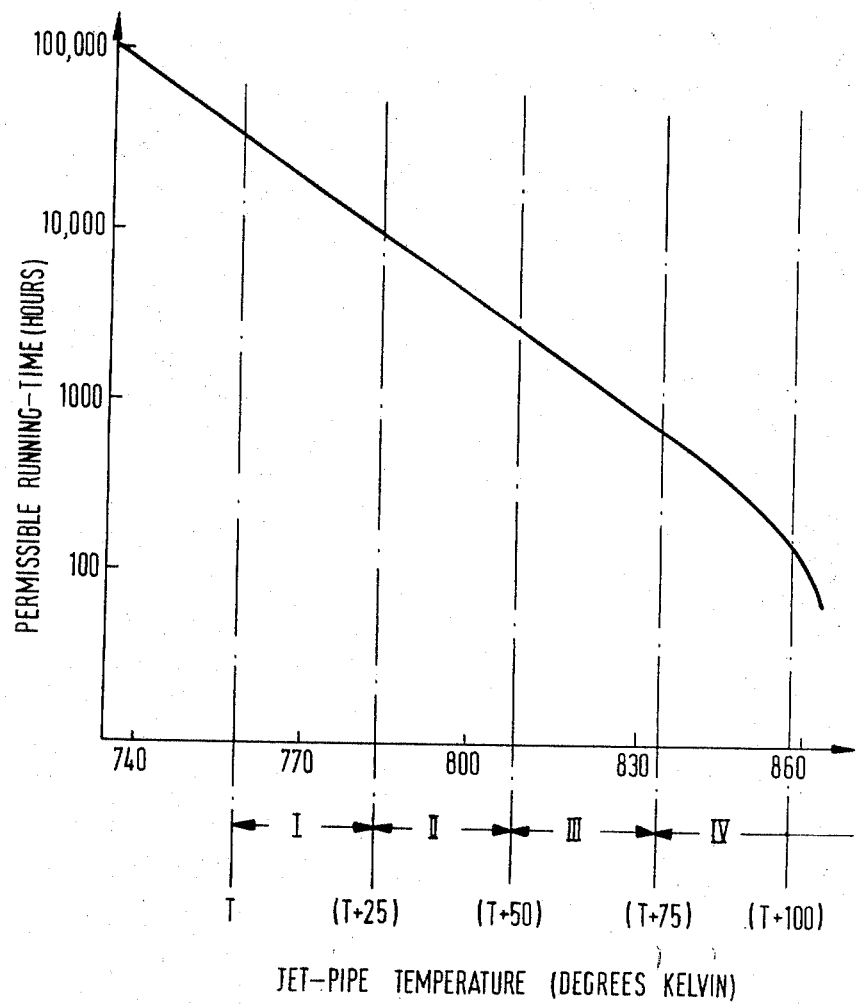
FIG. 1 shows a characteristic based on operational data of the gas-turbine engine, this characteristic serving to relate permissible running-time to a monitored operational parameter of the engine.

Each of the two forms of apparatus to be described monitors jet-pipe temperature of the gas-turbine engine and provides a digital representation of the expended life in accordance with both the monitored temperature and running-time. There is a substantially logarithmic relationship between the permissible running-time of the engine and jet-pipe temperature, this being shown by the linearity of the characteristic of FIG. 1, in which the ordinates of permissible running-time in hours are plotted to a logarithmic scale against jet-pipe temperature in degrees Kelvin. This relationship remains substantially the same irrespective of variations in other engine parameters (for example, speed), and accordingly it is possible to relate the engine-life solely to jet-pipe temperature. This is done in the present case by specifying a fixed number of units of permissible engine-life, and arranging that the rate at which these units are used up is varied in dependence upon the jet-pipe temperature. A basic, minimum rate of expenditure of the units is set to apply all the time the engine is operative, and it is in fact only when the jet-pipe temperature exceeds a threshold value T, of some 758 degrees Kelvin, that there is change from this. When the jet-pipe temperature exceeds the threshold value T, the rate of expenditure of engine-life units is increased above the basic rate by an amount that is appropriately related to the excess temperature. In ensuring appropriate action of the apparatus in this respect, the operative range of jet-pipe temperature above the threshold value T is divided into four nominally-equal temperature ranges, I to IV, that respectively extend from T to $(T+25)$, from $(T+25)$ to $(T+50)$, from $(T+50)$ to $(T+75)$, and upwards from $(T+75)$. The characteristic of FIG. 1 shows for practical purposes a linear relationship between the logarithm of permissible running time and jet-pipe temperature from the threshold temperature T up to the temperature $(T+100)$, and the four temperature ranges I to IV are provided on the basis of division of this interval of one hundred degrees Kelvin, into four equal parts embracing successive sections of the line-representation in the characteristic. The apparatus of FIG. 2, and its operation in relation to this division, will now be described.

Figure 2:
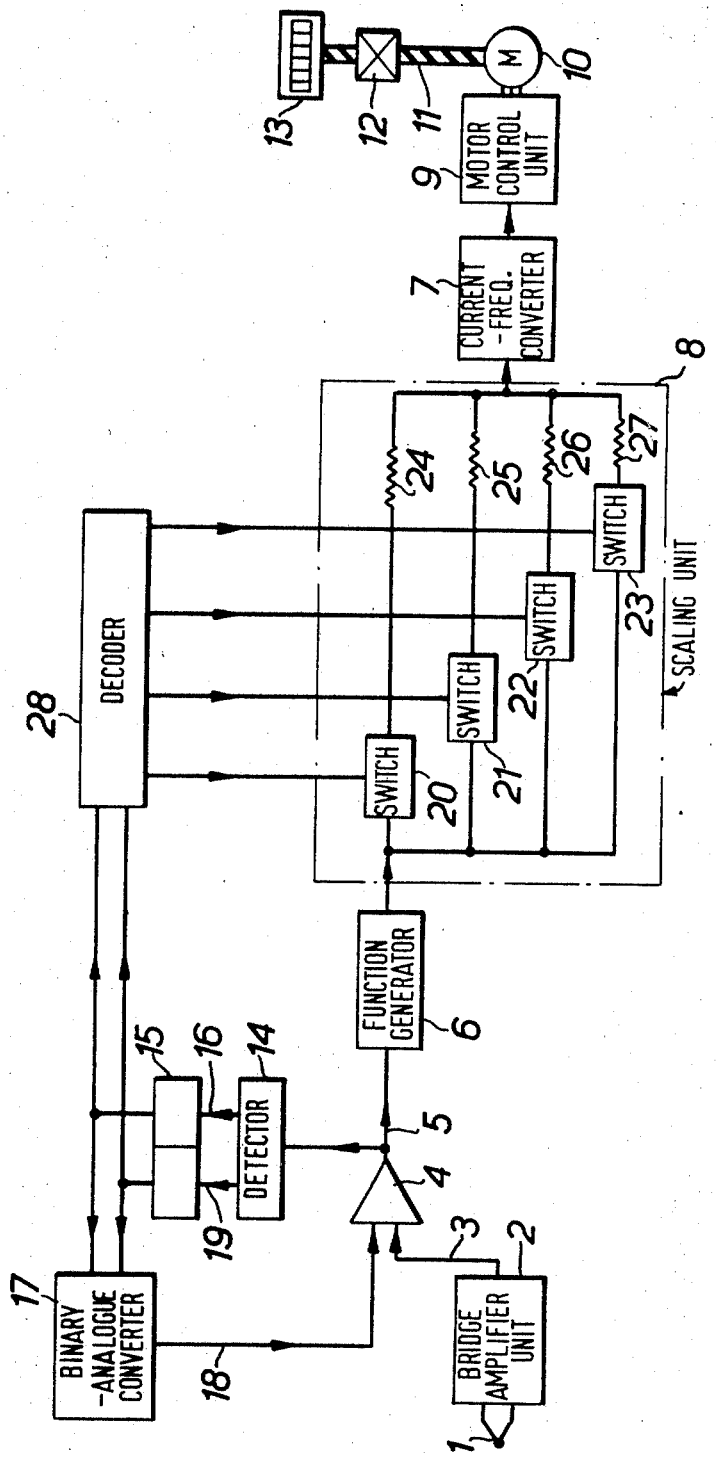
FIG. 2 is a diagrammatic representation, partly in schematic form, of a first of the two forms of engine-life apparatus.

Referring to FIG. 2, a thermocouple 1 is mounted in the engine to sense the jet-pipe temperature and to supply a signal in accordance therewith to a bridge-and-amplifier unit 2. The unit 2 has an output lead 3 and supplies to this lead a current signal dependent upon the sensed temperature. The signal supplied to the lead 3 is representative of the extent to which the sensed temperature exceeds the threshold value T, and is passed to an amplifier 4. The output signal of the amplifier 4 is supplied via a lead 5 to a function generator 6.

The generator 6 supplies to a current-to-frequency converter 7 via scaling unit 8, current that is logarithmically-related to the current-level of the lead 5. The converter 7 derives a signal of sawtooth waveform having a sawtooth-recurrence frequency dependent upon the integral with respect to time of the current received from the unit 8, and supplies this signal to a motor control unit 9. A bias current is added in the converter 7 to the current from the unit 8 in order to provide a basic, minimum recurrence frequency (corresponding to the basic rate of expenditure of engine-life) of the signal applied to the unit 9. The unit 9 controls energization of the stator windings of a three-phase electric motor 10, such that there is one revolution of the motor-shaft 11 for each cycle of the sawtooth waveform. The shaft 11 is coupled via gearing 12 to drive a cyclometer counter 13. The counter 13 provides a reading in decimal form of the number of revolutions of the shaft 11, and such reading provides the required representation of engine-life.

The expenditure of engine-life units represented by the counter 13 is related to the sensed jet-pipe temperature according to the logarithmic characteristic of FIG. 1, throughout the defined temperature ranges I to IV. The function generator 6 is the basic agency in providing the appropriate relationship, but in this does not require an excesively-wide range of operation; the four temperature ranges I to IV embrace more than one hundred degrees Kelvin and there is potentially a very wide range of current-levels on the lead 5, but the generator 6 in the present apparatus is not required to operate logarithmically beyond the comparatively narrow range experienced with sensed jet-pipe temperatures through twenty-five degrees Kelvin. More particularly, the range of input current-levels over which logarithmic operation is required is confined to that experienced with sensed jet-pipe temperatures through range I. Any departure from this narrow range of current-level on the lead 5 (hereinafter referred to as the "restricted operative range") is detected by a detector 14.

The detector 14 controls a two-stage binary counter 15. While the sensed jet-pipe temperature does not exceed the value $(T+25)$ the current-level on the lead 5 remains within the restricted operative range and the count of the counter 15 remains zero, that is to say "00." However, if the sensed temperature exceeds the value $(T+25)$, so as to depart from temperature range I, the consequent rise in current on the lead 5 causes the detector 14 to apply a pulse to the counter 15 via a lead 16. This pulse increases the count of the counter 15 by unity, that is to say, to "01". A binary-to-analogue converter 17 is responsive to change from "00" to "01" in the count of the counter 15 to supply current to the amplifier 4 via a lead 18. This current has a magnitude, C, equal to that which appears on the lead 3 in response to a sensed jet-pipe temperature of value $(T+25)$, and is applied to the amplifier 4 in opposition to the current supplied on the lead 3. The consequent decrease in output current from the amplifier 4 is sufficient to reduce the current-level on the lead 5 to lie within the restricted operative range in the case of sensed temperatures within the temperature range II, but not in the case of sensed temperatures within either range III or IV.

In the case of sensed temperatures within either range III or IV, the fact that the current-level on the lead 5 has not been reduced to the restricted operative range causes the detector 14 to emit a second pulse on the lead 16 to increase the count of the counter 15 to "10". This causes the current supplied by the converter 17 via the lead 18 to be doubled in magnitude to 2C. In the case of sensed temperatures within range III this is sufficient to return the current-level on the lead 5 to lie within the restricted operative range, but not so in the case of sensed temperatures within range IV. The detector 14 accordingly emits a third pulse on the lead 16 in the latter case, and this increases the count of the counter 15 to "11", with the result that the magnitude of current supplied by the converter 17 via the lead 18 is increased to 3C. It is only in the special circumstances in which the sensed jet-pipe temperature exceeds $(T+100)$ that the current-level on the lead 5 can now exceed the upper limit of the restricted operative range; no increase in the count of the counter 15 from "11" takes place in these circumstances.

The current-level on the lead 5 falls below the lower limit (nominally zero) of the restricted operative range in the event that the sensed temperature having once entered any one of the ranges II to IV, falls out of that range into any of the lower ranges, I to III. The detector 14 detects such circumstances and applies a pulse to the counter 15 via a lead 19 to reduce the count by unity, and this accordingly effects a reduction of magnitude C in the current supplied via the lead 18 by the converter 17. If this reduction is insufficient to restore the current-level on the lead 5 to the restricted operative range, a further pulse is emitted on the lead 19 by the detector 14, and then repeated if necessary, to effect the necessary reduction by successive steps of magnitude C, in the current supplied via the lead 18. The detector 14 is accordingly arranged to act with falling sensed temperatures as with rising sensed temperatures, to maintain the count of the counter 15 representative of the range I, II, III or IV of the jet-pipe temperature, and in this way suppress the natural current-level on the lead 5 and tend to maintain it within the restricted operative range.

Compensation for the suppression in natural current-level on the lead 5, effected within temperature ranges II to IV, is made by the scaling unit 8 in accordance with the count of the counter 15. The scaling unit 8 includes four switches 20 to 23 that are connected in series with individual resistors 24 to 27 to provide four parallel paths for current-flow from the function generator 6 to the converter 7. A decoder 28 that is responsive to the count of the counter 15, controls closure of the switches 20 to 23 to render only one of the four paths operative at any one time, the particular one being dependent upon the count. The switch 20 is closed to complete the path via the resistor 24 only while the count remains at "00", and the individual switches 21 to 23 are likewise closed to complete the paths via their resistors 25 to 27 for respective counts of "01", "10" and "11". The path through the switch 23 provides the least attenuation, the resistor 27 associated with this switch having a resistance value R to provide a nominal scaling-down factor of unity between the generator 6 and converter 7 for sensed temperatures within range IV. The other resistors 24 to 26 have resistance values of $(3.9)^3R$, $(3.9)^2R$ and $(3.9)R$ respectively, to provide scaling-down factors appropriate to the output current from the generator 6 for sensed temperatures within ranges I to III. The multiples of 3.9 used here arise from the multiples of twenty-five degrees Kelvin existing on the one hand between ranges II to IV, and range I on the other hand.

The output current from the generator 6 for any sensed temperature within range II, III or IV is the current appropriate to that same temperature when reduced respectively by twenty-five, fifty or seventy-five degrees Kelvin, as required to bring it into range I. By virtus of the linearity of the relationship between the logarithm of permissible running time and jet-pipe temperature, the rate of expenditure of engine-life applicable to any sensed temperature through ranges II and III and up to temperature $(T+100)$, is a straightforward multiple of the rate applicable to the temperature of range I. The appropriate multiplying factor in this is $(3.9)$, $(3.9)^2$ or $(3.9)^3$ depending upon whether the sensed temperature lies within range II, III or IV respectively, and is given effect in the scaling unit 8 by the proportionate reductions in value of the individual resistors 25, 26 and 27 with respect to the resistor 24. The current supplied via the scaling unit 8 to the converter 7 is as a result related in accordance with the logarithmic characteristic of FIG. 1 to the rate of expenditure of engine-life units appropriate to the sensed jet-pipe temperature, through ranges II and III, and up to temperature $(T+100)$ in range IV, as well as through range I.

Above temperature $(T+100)$ the relationship between the logarithm of permissible running time and jet-pipe temperature is significantly non-linear. The appropriate relationship in this respect between the current supplied to the converter 7 via the scaling unit 8 and the sensed temperature, is achieved in the function generator 6 alone. As referred to above, the current-level on the lead 5 remains in excess of the upper limit of the restricted operative range, only in those special circumstances in which the sensed jet-pipe temperature exceeds $(T+100)$. The generator 6 drifts from its truly logarithmic operation in response to a maintained current-level exceeding this upper limit, to provide an output current appropriately related to the sensed temperature for application to the current-to-frequency converter 7 via the switch 23 and resistor 27 applicable to range IV.

The function generator 6 may have the form shown in FIG. 3, in which the signal on the lead 5 is applied to an amplifier 30. The signal on the lead 5 is opposed in the amplifier 30 by degenerative feedback that is derived by a non-linear network 31 from the signal appearing on an output lead 32 of the amplifier 30. The signal on the lead 32 is within the network 31 applied via a resistor 33 to develop a voltage dependent upon the output current of the amplifier 30 across four shunt paths that involve resistors 34 to 37 respectively. The three shunt paths involving the resistors 35 to 37 include respectively one, two and three Zener diodes 38 serially-connected with the resistors, whereas the path involving the resistor 34 includes none.

For low levels of output current on the lead 32 the Zener diodes 38 all remain non-conductive so that the degenerative feedback applied to the amplifier 30 is substantially solely that due to current flow through the resistor 34. The diodes 38 become conductive at higher current-levels on the lead 32, the single diode 38 in series with the resistor 35, then the pair of diodes 38 in series with the resistor 36, and finally the three diodes 38 in series with the resistor 37, becoming conductive in turn at successively higher levels of this output current and corresponding respectively to sensed-temperature values of $(T+6)$, $(T+12)$ and $(T+18)$. There is as a result, a stepwise modification of the degree of feedback in dependence upon the level of output current on the lead 32, and this is such that for practical purposes the logarithm of the current-level on the output lead 32 is proportional to the current-level on the input lead 5 throughout the restricted operative range. There is divergence from the logarithmic relationship for input current-levels in excess of the upper limit of the range, as required in range IV for temperatures in excess of $(T+100)$. The signal on the output lead 32, as applied via the scaling unit 8 to the converter 7, is in this manner appropriately representative of the rate of expenditure of engine-life according to the logarithmic characteristic of FIG. 1.

The current-to-frequency converter 7 may have the form shown in FIG. 4, in which the signal supplied from the scaling unit 8 is applied via a lead 40 to a transistor stage 41. The transistor stage 41 serves to add to the current supplied via the lead 40 a bias current corresponding to the basic rate of expenditure of engine-life, so that the output current of the stage 41 applied to an amplifier 42, is representative of the full rate of expenditure of engine-life appropriate to the sensed jet-pipe temperature.

A capacitor 43 is connected between the output and input of the amplifier 42, so that the amplifier 42 and capacitor 43 together act to integrate with respect to time the current signal received from the transistor stage 41. The emitter-collector current path of a transistor 44 is connected across the capacitor 43 to effect periodic discharge of the capacitor 43, conduction of the transistor 44 to discharge the capacitor 43 being controlled by a discharge-control circuit 45. The circuit 45 receives the output signal of the amplifier 42 appearing on a lead 46, and emits a pulse whenever during the integration process the signal on the lead 46 reaches a predetermined negative level. This pulse is applied to the base electrode of the normally non-conductive transistor 44 so as to cause the transistor 44 to conduct and discharge the capacitor 43, for the duration of the pulse.

Until the predetermined negative level is reached, the output signal on the lead 46 increases linearly with time in the negative sense. The rate of this increase is dependent upon the magnitude of the signal applied to the amplifier 42 by the transistor stage 41, that is to say, at a rate in accordance with the rate of expenditure of engine-life. When the predetermined negative level is reached on the lead 46, the pulse then emitted by the circuit 45 causes the capacitor 43 to be discharged via the emitter-collector current path of the transistor 44. The output signal of the amplifier 42 consequently returns to zero and the integration process recommences, the sequence of events recurring to provide thereby a negative-going sawtooth waveform on the lead 46 having a frequency corresponding to the rate of expenditure of engine-life. The sawtooth waveform is supplied from the lead 46 to the motor control unit 9 to drive the motor 10 and effect the appropriate change in the reading of the counter 13.

The motor control unit 9 may have the form described with reference to FIG. 3 in U.S. Pat. No. 3,362,217. The latter patent also includes description with reference to FIG. 5 of a form of discharge control circuit suitable for use as the circuit 45 of the current-to-frequency converter that is described above with reference to FIG. 4 of the drawings accompanying the present specification.

In the apparatus described above with reference to FIG. 2, compensation for the restricted operative range effected with the function generator 6 is made in advance of the current-to-frequency converter 7, but this is not necessarily so. The compensation may alternatively be made in the converter itself or in the motor-drive arrangement following it. Apparatus in which compensation is made in the drive arrangement will now be described with reference to FIG. 5.

Referring to FIG. 5, a bridge-and-amplifier unit 50 develops from the signal derived by a thermocouple 51, a current signal representative of the extent to which sensed jet-pipe temperature exceeds the threshold value T. This signal is passed via a lead 52 to an amplifier 53 that acts together with a non-linear network 54 to provide a non-linear function generator for supplying current in accordance with the relevant rate of expenditure of engine-life. The non-linear network 54, which may have the same form as the network 31 described above with reference to FIG. 3, provides non-linear degenerative feedback to the amplifier 53, and in this respect is supplied with the output signal of the amplifier 53 via a diode 55. The signal supplied via the diode 55 is also supplied via a resistor 56 to a current-to-frequency converter 57. A bias current in accordance with the basic, minimum rate of expenditure of engine-life applicable to the threshold temperature T, is supplied to the converter 57 via a resistor 58 to be added to the current supplied via the resistor 56. The converter 57 accordingly provides an output waveform that has a frequency dependent upon the rate of expenditure of engine-life appropriate to the current-level on the lead 52.

The current-level on the lead 52 is restricted to an operative range corresponding to jet-pipe temperatures within range I. Any departure from this operative range results in an increase or decrease beyond predetermined upper and lower limits of the output current of the amplifier 53, and is detected to control a two-stage binary counter 59. A Zener diode 60 connected to the junction of the diode 55 and resistor 56, conducts in response to any tendency for the output current-level to increase beyond the upper limit, whereas a diode 61 connected to the junction of the amplifier 53 and diode 55 conducts in response to any tendency for the output current-level to decrease from the lower limit. The count of the counter 59 is increased (up to a maximum of "11") in response to conduction of the Zener diode 60 and decreased (down to a minimum of "00") in response to conduction of the diode 61. According to whether the count is "01," "10," or "11," so an AND gate 62, an AND gate 63, or both, are opened to supply current to the lead 52 via resistors 64 and 65 to reduce the current-level on the lead 52. The count of the counter 59 is increased or decreased as appropriate to follow any change in the sensed temperature from one temperature range I to IV to another, and with this change in count there is a change in the total current-magnitude supplied via the gates 62 and 63, appropriate to maintain the current-level on the lead 52 within the restricted operative range for all sensed temperatures up to the value ($T+100$).

A decoder 66 is responsive to the count of the counter 59, and according to the count opens one or other of four AND gates 67 to 70. The gates 67 to 70 control the supply of the output signal of the current-to-frequency converter 57 via a frequency-divider 71 to a ring-counter 72. The frequency-divider 71 divides the frequency of the signal from the converter 57 by a factor of 128, 32, 8 or 2, according to whether the signal is passed through via the gate 67, 68, 69 or 70, respectively. The decoder 66 opens the gate 70 when the count of the counter 59, is "11," so that the signal from the converter 57 is passed to an OR gate 73 within the frequency-divider 71, for passage then to the ring-counter 72 via a single divided-by-two circuit 74. When the count of the counter 59 is "10," the decoder 66 opens the gate 69 and in these circumstances the signal from the converter 57 is passed to the OR gate 73 only after passage successively through an OR gate 75 and two divide-by-two circuits, 76 and 77. The gates 68 and 67 are opened for counts of "01" and "00" respectively, and in both cases passage of the signal through the circuits 76, 77 and 74 in succession to the ring-counter 72, is preceded by passage through an OR gate 78 and two further divide-by-two circuits 79 and 80 to the OR gate 75. In the case of the count "00", however, this passage through the circuits 79 and 80 is preceded by passage through two divide-by-two circuits 81 and 82 to the OR gate 78.

The ring-counter 72 responds to the signal it receives from the frequency-divider 71 to energize a three-phase electric motor 83 that drives a cyclometer counter 84 through gearing 85 to provide a decimal reading of engine-life. The motor 83 is energized by the ring-counter 72 to drive the counter 84 at a speed in accordance with the frequency of the signal received from the frequency-divider 71. The division effected by the frequency-divider 71 in accordance with the count of the counter 59 (and thereby in accordance with the range I to IV of the sensed jet-pipe temperature), acts to provide compensation in this frequency for the restriction of current-level imposed on the lead 52 for sensed temperatures within ranges II to IV. The division factors used in the frequency-divider 71 in achieving the required compensation, involve powers of 4.0 rather than powers of 3.9 appropriate to the temperature ranges based on twenty-five degrees Kelvin, indicated in FIG. 1. Although it would clearly be possible to modify the frequency-divider 71 to provide division factors based on 3.9, the complication implicit in this is avoided in the present case simply by arranging that the apparatus operates to four ranges, only slightly different from those indicated, for which division factors based on 4.0 are more appropriate.

A circuit arrangement that is suitable for use as the bridge-and-amplifier unit 50 of the apparatus of FIG. 5 will now be described with reference to FIG. 6. This form of circuit arrangement can similarly be used to provide the comparable unit 2 in the apparatus of FIG. 2.

Figure 6:
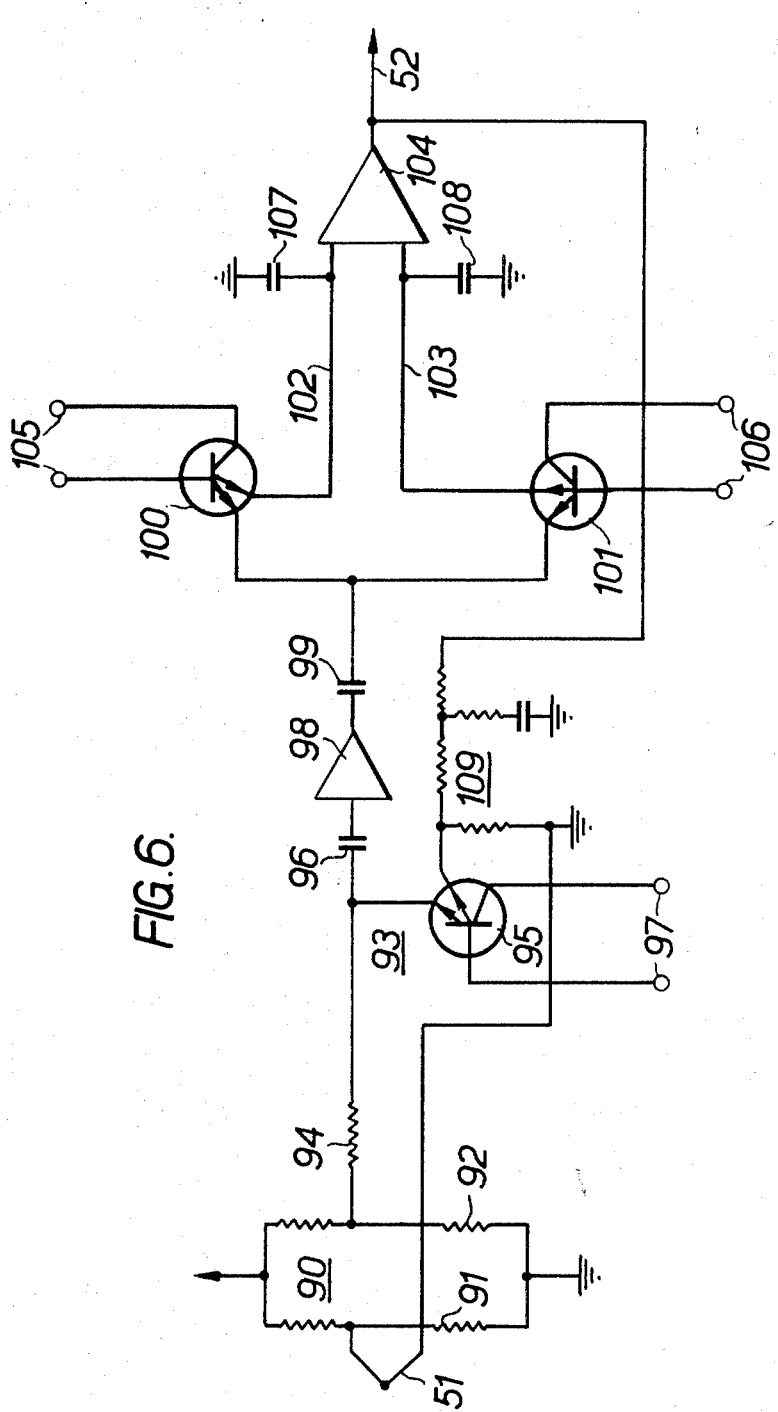
FIG. 6 is a circuit diagram of a bridge-and-amplifier unit suitable for use in the apparatus of FIG. 5.

Referring to FIG. 6, the signal derived by the thermocouple 51 is applied within the unit 50 to a bridge circuit 90. The bridge circuit 90 includes a temperature-sensitive resistor 91 for correcting for variation in the cold-junction temperature of the thermocouple 51, and a resistor 92 that is set to a value such that the circuit 90 is balanced when the sensed jet-pipe temperature has the threshold value T. A chopper amplifier 93 that is connected to the bridge circuit via a resistor 94, derives a square-wave signal that is modulated in accordance with the extent to which the sensed temperature exceeds this set threshold.

The amplifier 93 includes a double-emitter transistor 95 that has a first of its two emitter electrodes connected to the junction of the resistor 94 with a capacitor 96. An alternating-current switching signal is in operation supplied across the base and collector electrodes of the transistor 95 from a pair of terminals 97, and this causes a square-wave signal-component to appear at the junction of the resistor 94 and capacitor 96. This signal-component has an amplitude dependent upon the degree to which the bridge circuit 90 is unbalanced in the sense resulting from jet-pipe temperatures exceeding the set threshold value T, and is applied via the capacitor 96 to an alternating-current amplifier 98.

The output signal of the amplifier 98 is supplied via a capacitor 99 to the first emitter electrode of each of two double-emitter transistors 100 and 101. The second emitter electrodes of the transistors 100 and 101 are connected via separate input leads 102 and 103 of a direct-current amplifier 104, and the switching signal supplied across the terminals 97, is also supplied across the base and collector electrodes of the transistors 100 and 101 from pairs of terminals 105 and 106. The switching signal is supplied with opposite phasing to the two transistors 100 and 101 so that they conduct alternately with one another. The transistors 100 and 101 accordingly supply pulses of direct current to the leads 102 and 103 alternately, each such pulse having a magnitude dependent upon the extent to which the sensed jet-pipe temperature exceeds the threshold value T. The pulses supplied on the lead 102 are of opposite polarity to those supplied on the lead 103, and so with smoothing provided by capacitors 107 and 108, act together to establish a direct-current input signal to the amplifier 104 dependent upon the excess temperature.

The output signal of the amplifier 104 provides the output signal of the bridge-and-amplifier unit 50 and is accordingly supplied to the lead 52. This signal is also supplied via an integrating network 109 within the unit 50 to provide degenerative feedback to the second emitter electrode of the transistor 95. This feedback provides a phase-advance component in the operation of the unit 50 to compensate, in particular, for the temperature-time lag of the thermocouple 51.

It has already been explained, more particularly in relation to the apparatus of FIG. 2, how operation in accordance with the non-linear part of the characteristic of FIG. 1 is achieved using "drift" of the function generator from its normal action. "Drift" of this nature may clearly be used for any temperature range, not only the upper range, where a characteristic more complex than that of FIG. 1 is encountered. As an alternative, or in addition, it is possible to deal with a more-complex characteristic by arranging that the current-to-frequency converter used has a non-linear conversion factor.

We claim:

1. Apparatus for providing a representation of engine-life in accordance with a predetermined operational parameter of the engine, comprising means for sensing the value of said parameter, means for deriving a first signal that is dependent upon the sensed value of said parameter, a function generator for deriving in accordance with said first signal a second signal dependent upon the rate of expenditure of engine-life, and means for providing said representation of engine-life in accordance with said second signal, said means for deriving said first signal including means for effecting adjustment of said first signal in response to circumstances in which the sensed value of said parameter lies outside a predetermined operational range, said adjustment when effected acting to confine said first signal to correspond to a value of said parameter that lies within said range and is dependent upon the sensed value, and said means for providing said representation of engine-life including means to provide compensation in said representation for the adjustment effected as aforesaid.

2. Apparatus according to claim 1 wherein said means for effecting adjustment of said first signal is means for effecting said adjustment in steps, the number of steps involved in said adjustment being dependent upon the sensed value of said parameter, and wherein said means for providing compensation is means to provide said compensation in accordance with the number of said steps involved in the said adjustment.

3. Apparatus according to claim 1 including input means for deriving a signal that has a magnitude in accordance with the sensed value of said parameter, a signal transmission arrangement for transmitting the signal derived by said input means to said function generator, said signal transmission arrangement including means that is operable selectively for effecting a change in magnitude of the transmitted signal during its transmission to said function generator, and detector means for operating the selectively-operable means in dependence upon the sensed value of said parameter, said function generator being responsive to the signal received thereby from said signal transmission arrangement to derive said second signal in accordance with the magnitude thereof.

4. Apparatus according to claim 3 wherein said selectively-operable means is means that is operable selectively for effecting said change by subtraction of a predetermined signal-magnitude from the transmitted signal during its transmission via the transmission arrangement.

5. Apparatus according to claim 3 wherein said detector means includes means for providing a digital representation in accordance with the sensed value of said parameter, said digital representation being indicative of to which of a plurality of possible ranges of said parameter the sensed value belongs, and the amount of the said change in magnitude effected to the said transmitted signal by said selectively-operable means being dependent upon said digital representation.

6. Apparatus according to claim 5 including means for regulating the magnitude of said compensation in accordance with said digital representation.

7. Apparatus according to claim 3 including a scaling unit connected to said function generator for deriving a signal having a magnitude that is dependent upon said rate of expenditure of engine-life as multiplied by a scaling factor, the value of said scaling factor being dependent upon the amount of said change in magnitude effected to said transmitted signal during its transmission via the transmission arrangement, and an output arrangement for providing said representation of engine-life in accordance with the magnitude of signal derived by said scaling unit.

8. Apparatus according to claim 3 wherein said detector means is means for operating said selectively-operable means in dependence upon whether the magnitude of signal supplied to the function generator from the transmission arrangement departs from a predetermined range.

9. Apparatus according to claim 3 wherein said detector means is means for operating said selectively-operable means in dependence upon whether the magnitude of said second signal departs from a predetermined range.

10. Apparatus according to claim 3 including frequency-deriving means connected to said function generator for deriving a signal having a frequency that is dependent upon said rate of expenditure of engine-life as multiplied by a scaling factor, the value of said scaling factor being dependent upon the amount of said change in magnitude effected to said transmitted signal during its transmission via the transmission arrangement, and an output arrangement for providing said representation of engine-life in accordance with the frequency of signal derived by said frequency-deriving means.

11. Apparatus according to claim 10 wherein said frequency-deriving means comprises a waveform generator for generating a signal having a frequency in accordance with said second signal, and a frequency-divider for supplying the signal generated by said waveform generator to said output arrangement after division of its frequency, the extent of said division being dependent upon the amount of said change in magnitude effected to said transmitted signal.

12. Apparatus according to claim 3 wherein said means for sensing the value of said parameter is means for sensing an operational temperature of the engine.

References Cited

UNITED STATES PATENTS 3,250,901 5/1966 Brahm _____ 73—117.2 X
3,357,239 12/1967 Hohenberg _____ 73—116

JERRY W. MYRACLE, Primary Examiner

U.S. Cl. X.R.

73—346